Sept. 26, 1967  R. L. BENFORD ETAL  3,343,305
MECHANISM FOR SHAPING CAMS

Filed Jan. 14, 1965  4 Sheets-Sheet 1

*Inventors*
Robert L. Benford
C. Walton Musser
John L. Wheeler
By their Attorney Carl E. Johnson

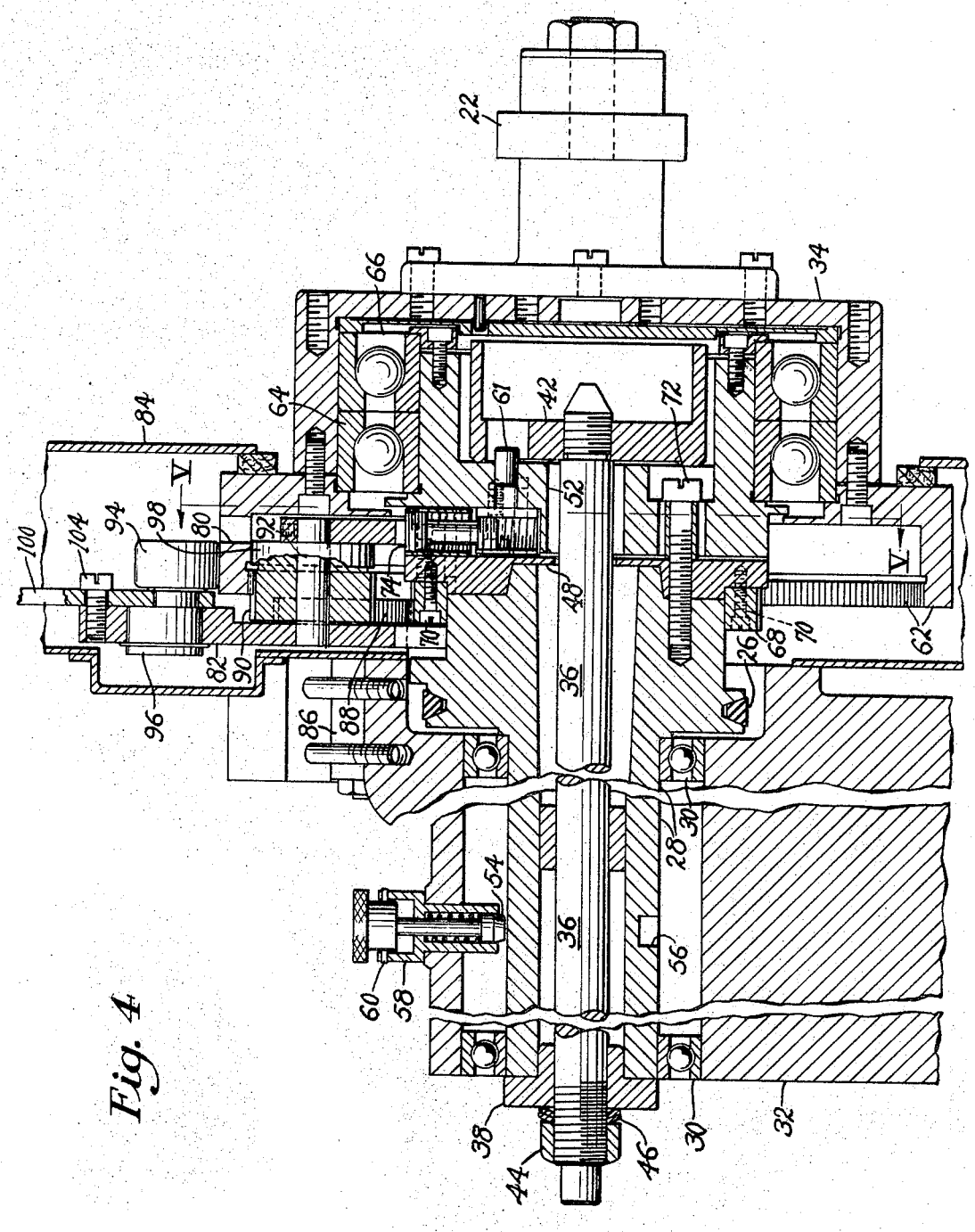

Sept. 26, 1967  R. L. BENFORD ETAL  3,343,305
MECHANISM FOR SHAPING CAMS
Filed Jan. 14, 1965  4 Sheets-Sheet 3
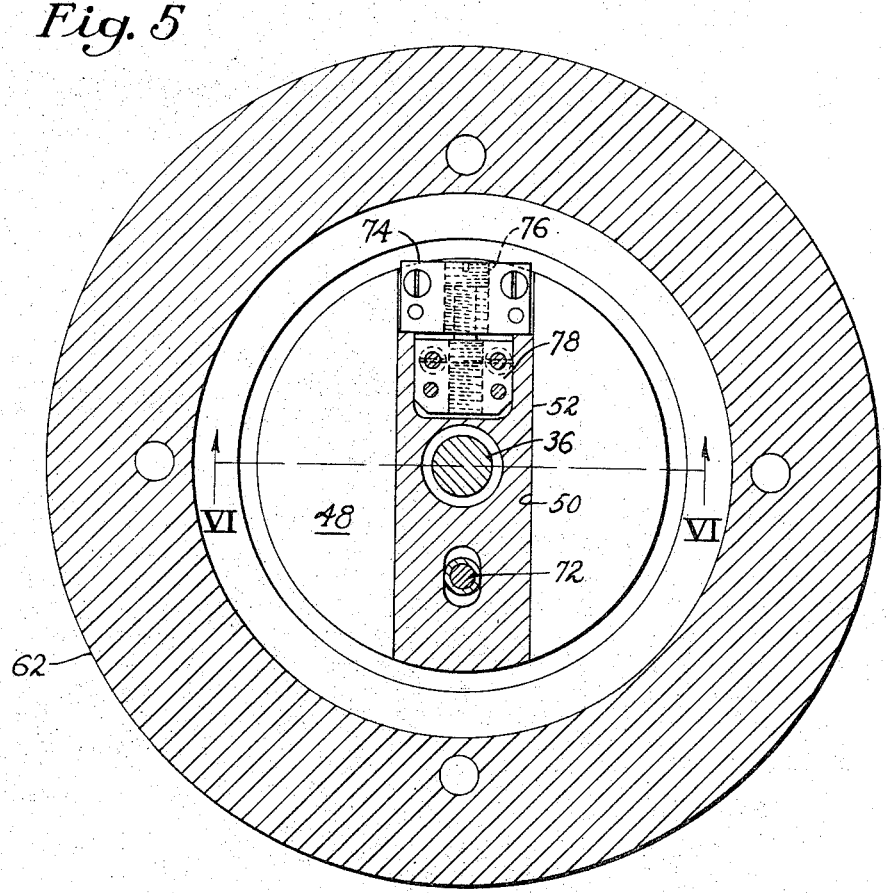
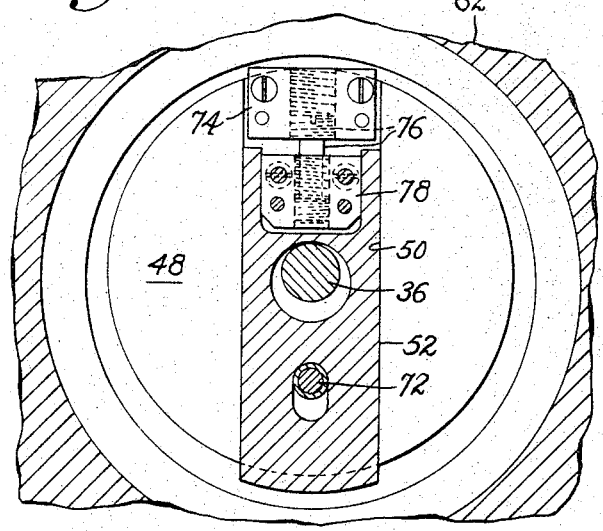
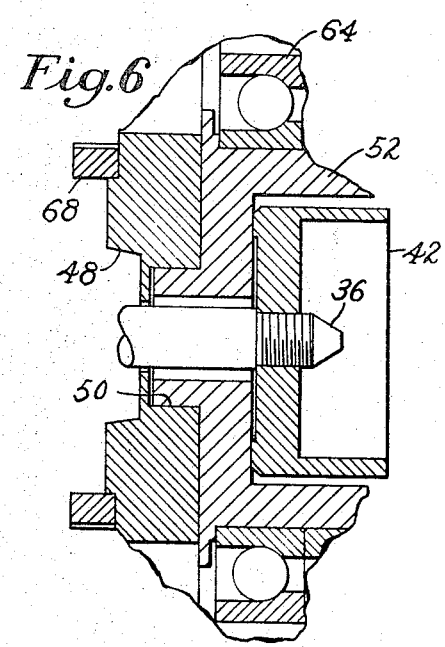

Sept. 26, 1967    R. L. BENFORD ETAL    3,343,305
MECHANISM FOR SHAPING CAMS
Filed Jan. 14, 1965    4 Sheets-Sheet 4
Fig. 8
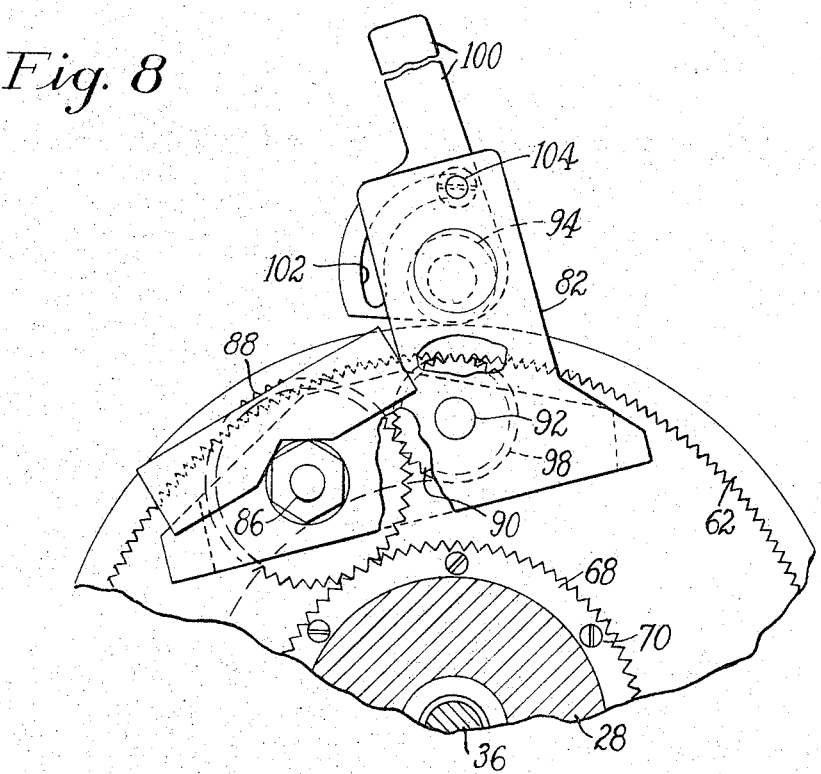
Fig. 9
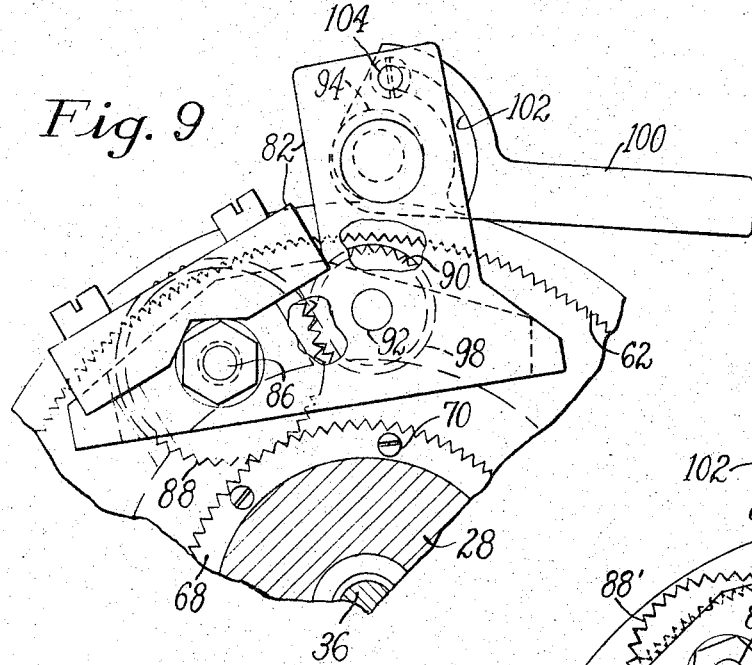
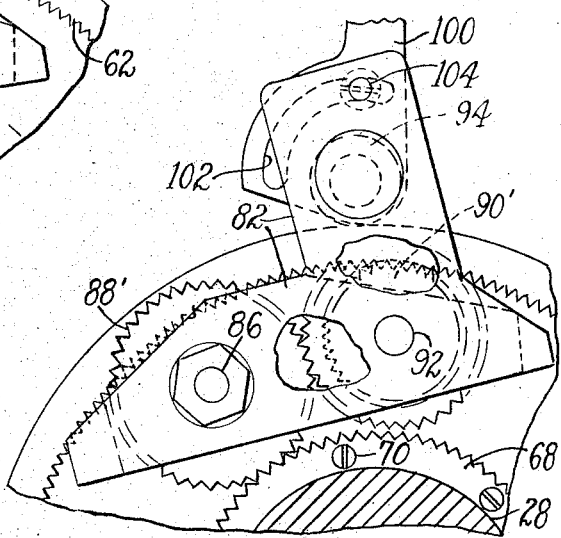
Fig. 10

United States Patent Office 3,343,305
Patented Sept. 26, 1967

3,343,305
MECHANISM FOR SHAPING CAMS
Robert L. Benford, Swampscott, Mass., C. Walton Musser, Palos Verdes Estates, Calif., and John L. Wheeler, South Dartmouth, Mass., assignors to United Shoe Machinery Corporation, Flemington, N.J., a corporation of New Jersey
Filed Jan. 14, 1965, Ser. No. 425,456
3 Claims. (Cl. 51—105)

ABSTRACT OF THE DISCLOSURE

An attachment for a machine tool such as a grinder for precisely forming work pieces with surfaces having at least a portion thereof of sinusoidal shape. There is provided, in combination with a rotary forming tool, a drive member rotatable on an axis, and mechanism for supporting the work for rotation about an axis adjustably eccentric to that of the tool, a drive system connected to the drive member and adapted to rotate the work supporting mechanism at a speed in selected ratio to that of the drive member. Thus, depending on the gearing selected, predetermined lobar cams or harmonic drive wave generators may be accurately shaped.

---

This invention relates to machine tools, and more especially to an attachment or adaptor for enabling a machine precisely to shape or treat a work piece such as a cam with a wavy periphery having one or more lobes. Although the invention is herein illustrated as applied to a grinding machine of a type wherein a rotating work piece is moved relatively to the stationary axis of a rotary grinding wheel, it will be apparent that the invention could as well pertain to a machine wherein the forming tool is to be bodily moved relatively to a stationary axis of a rotary blank. Also, it will be understood that the invention is not limited to the grinding art, but is fully applicable to numerous forming and finishing operations which may have only general resemblance to grinding and shaping.

There is considerable need for a mechanism by which sinuous surfaces of parts, such as lobar cams, may be formed expeditiously and with precision. By way of example, in the production of mechanical wave generators for harmonic drive type speed reducers or increasers (for instance, of the general type disclosed in United States Letters Patent No. 2,906,143, issued upon application of C. Walton Musser on Sept. 29, 1959), external and internal cams having 1, 2, 3 or more lobes are often required. Multi-lobed cams for this and other purposes must have their eccentricity or "throw" very exactly determined, and their angularity of major and minor axes about a center must be accurately established. Elliptoidal or 2-lobed cams are more commonly used in harmonic drives, but whether of 2, 3 or more lobes, it is essential that their cam curvature be of harmonic shape, duplicatable without extraordinary skill, and that their high and low points occur at the prescribed equal angularity to insure proper cyclical operation without undue stress or wear.

It accordingly is a primary object of this invention to provide an improved machine for precisely producing sinusoidal cams of the single or multi-lobe type and with selected ratio to the speed of the spindle 28 and adjustably harmonic wave form. Another object of the invention is to provide an improved fixture for a machine tool, such as a grinder of otherwise conventional construction including a grinding wheel and a work head spindle, for peripherally forming lobar work pieces with selected sinusoidal shapes.

In accordance with the foregoing objects and as a feature of the invention, means is provided in a machine tool whereby a work piece to be formed is mounted on a faceplate for rotation in predetermined speed ratio to the work head spindle and eccentrically adjustable with respect thereto. The illustrative arrangement is such that in each revolution of the work head spindle, the work piece advances and retracts from the grinding wheel harmonically, once in the case of gearing effecting a 1:1 speed ratio for producing a single lobe cam; twice in the case of substitutable gearing effecting faceplate rotation half as fast as the spindle for producing an elliptoidal or 2-lobe cam; and three times when other substitutable gearing drives the faceplate one-third the spindle speed for producing cams having 3 equi-spaced lobes, etc.

The foregoing and other features of the invention together with the novel details and combinations of parts, will now be more particularly described in connection with an illustrative embodiment thereof and with reference to the accompanying drawings, in which:

FIG. 4 is a vertical section through the shaping fixture of FIG. 1 and showing a work head spindle with slide assembly, an independently rotatable face plate assembly, and a floating interchangeable gearing system for driving the faceplate assembly in selected speed ratio;

FIG. 5 is a section taken on the line V—V of FIG. 4 showing slide adjusting means;

FIG. 6 is a section taken on the line VI—VI of FIG. 5, indicating a slide and guide mounting for a radially adjustable end of the work head spindle;

FIG. 7 is a section corresponding to that of FIG. 5 but indicating the parts after an eccentric adjustment;

FIG. 8 is a view in end elevation of portions of the "floating" gear box shown in FIG. 4 in its closed or driving position;

FIG. 9 is a view corresponding to FIG. 8, of the gear box being in its open, inoperative or adjusting position; and FIG. 10 is a view corresponding to FIG. 8 but indicating a substituted gearing system providing, for instance, a 3:1 reduction for producing a 3-lobe cam as shown in FIG. 3.

Figure 1:
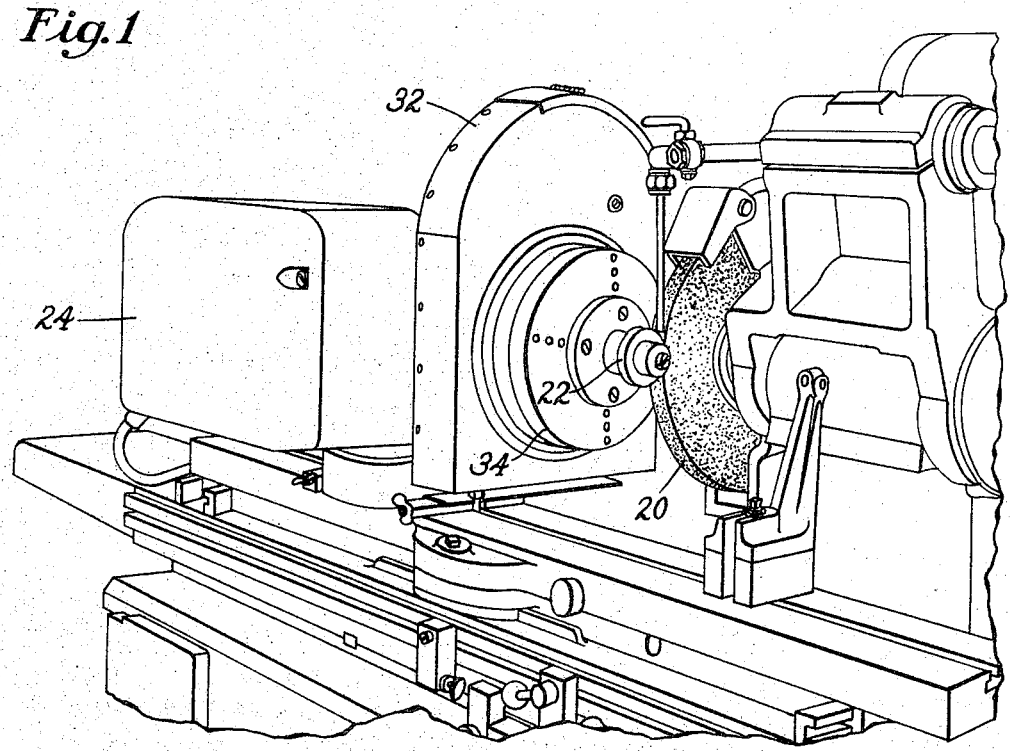
FIG. 1 is a perspective view of a conventional grinder having attached a cam shaping fixture made in accordance with this invention.
Figure 2:
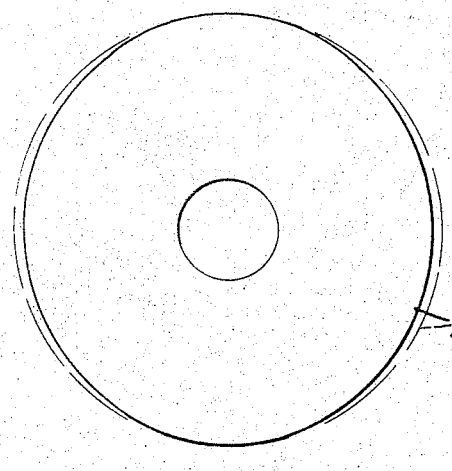
FIG. 2 is a view of an elliptoidal or 2-lobe cam (in solid line) and indicating (in phantom) the fully circular blank from which it was ground.
Figure 3:
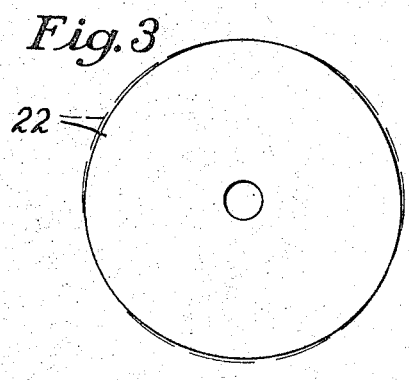
FIG. 3 is a view, similar to FIG. 2, of a 3-lobe cam formed by the machine.

In the illustrative machine a grinding wheel 20 (FIG. 1) is rotatably mounted for operation on a fixed horizontal axis. For rotation and relative advance toward and from the wheel 20 a work piece 22, preferably initially circular as indicated in FIGS. 2 and 3, is adjustably mounted in the machine as will be explained. A motor drive housing 24 (FIG. 1) adjustably swivel mounted on the bed of the machine encloses a motor (not shown) connected by a V-belt 26 (FIG. 4) to a tubular work head spindle 28 of the grinding machine. This spindle accordingly is rotatably driven about a fixed horizontal axis and has axially spaced bearings 30, 30 in a head casting 32 (FIGS. 1 and 4) secured on the machine bed.

A face plate 34 (FIGS. 1 and 4) upon which the work piece 22 is to be secured for shaping is rotatably driven in selected ratio to the speed of the spindle 28 and adjustably offset radially from the axis thereof. To this end the spindle 28 axially receives a drawbolt 36 extending through a clamping collar 38 and a spacer 40, an end of the drawbolt threadedly receiving a concentric clamping hub 42 (FIGS. 4 and 6). A nut 44 threaded on the other end of the drawbolt is tightened against a Belleville washer 46 engaging the collar 38 to lock the spindle 28, the drawbolt 36, the clamping hub 42 and a guide 48 (FIGS. 4 and 6) secured to the spindle and having a diametric guide slot 50 (FIG. 6), in a spindle assembly rotatable about the fixed spindle axis. Tightening of the nut 44 also maintains a slide hub 52 (FIGS. 4-7 inclusive), of eccentricity adjusting mechanism later to be explained, in selected position in the slot 50. The washer 46, when the nut 44 is somewhat loosened to permit eccentric adjustment of the faceplate 34 as hereinafter described, serves to hold the parts of the spindle assembly in cooperative relation.

For holding the spindle assembly in a determined angular position about its common axis, as is convenient and desirable in the course of making initial adjustments, a spring-pressed plunger 54 (FIG. 4) is urged radially into a mating slot 56 formed in the spindle 28. This plunger is slidable in a tubular insert 58 in the casting 32 and carries a cross pin 60. When retracted radially by means of a knurled head of the plunger and turned for insertion into short axial slots of the insert 58 as shown, the pin 60 maintains the plunger disengaged, but upon turning of the pin at right angles to seat it within longer axial slots (not shown) of the insert, the plunger assumes its locking position. A pin 61 in a bore of the slide hub 52 axially projects into the clamping hub 42 to prevent the latter from turning when the nut 44 is to be turned on the drawbolt.

The faceplate 34 is secured to an internal ring gear 62 (FIGS. 4 and 9) driven by gearing to be described, and both the plate and the gear 62 rotate about the slide hub 52 on preloaded precision duplex bearings 64, 66. A drive gear 68 (FIGS. 4, 8 and 9) is secured by bolts 70 to the guide 48 in concentric relation to the spindle axis, the guide 48 itself being additionally anchored to the spindle by a bolt 72 and spacer such that the hub 52 is also held axially, but loosely.

Mechanism next to be explained is provided for eccentrically adjusting the slide hub 52 on the guide 48 and hence adjusting the faceplate 34 with respect to the spindle axis. Referring to FIGS. 4, 5 and 7, a block 74 is secured to the guide 48 and formed with a threaded bore to receive a spool-shaped fine adjusting screw 76. An inner end of this screw is formed with thread of the same hand but different lead, the inner screw end being received in a bore of a block 78 affixed to the slide hub 52. Accordingly, assuming the drawbolt 36 is not fully tightened, an operator may apply a screw driver or wrench through an axis hole 80 FIG. 4 to the head of the screw 76 and suitably change eccentricity of the slide hub 52, for example from the relative position in FIG. 5 to that shown in FIG. 7, and hence correspondingly adjust the eccentricity of the faceplate-mounted work 22.

For rotating the work at the selected speed, driving of the gear 62 eccentrically about the concentric drive gear 68 is effected by a floating gear system. FIGS. 8 and 9 show in driving and adjusting positions, respectively, the gearing provided for operating the faceplate 34 at half the speed of the drive gear 68 or of the spindle speed. A gear box 82 (FIGS. 4, 8-10) within a housing 84 affixed on the casting 32 is pivoted on a fulcrum shaft 86 on the casting 32, and an idler gear 88 mounted on the shaft 86 remains in mesh with the driver gear 68. An idler gear 90 carried by a shaft 92 journaled in the box 82 and operatively engaged by the gear 88 is, as shown in FIG. 8, also engageable with the internal ring gear 62. This latter engagement is effected by a cam roll 94 (FIGS. 4 and 8-10) eccentrically supported on a pivot 96 in the box 82, the roll 94 and a roller 98 formed concentrically on the hub of the idler gear 90 cooperatively engaging inner and outer rim portions, respectively, of the ring gear 62. In this way the selected eccentricity of the latter will incidentally cause the gear box 82 to oscillate through a small angle about the shaft 86 while cooperating gears remain engaged to provide faceplate rotation at a speed half that of the usual spindle speed.

A proper operating position of the cam roll 94 is adjustably selected and maintained by means of a locking lever 100 (FIGS. 4 and 8-10) bored for receiving the eccentric hub of the pivot 96. A slot 102 in the lever 100 is arcuately concentric with the pivot 96 and slidably receives a shoulder screw 104 threaded into the gear box 82. Thus loosening the screw 104 permits turning of the lever 100 from its secured position shown in FIG. 8 to that indicated in FIG. 9 to lower the gear 90 out of driving relation with the ring gear 62 when eccentricity is to be modified or a new wave shape produced. If, for instance, it is desired to shape another blank 22 having an elliptoidal shape wherein the diameters on the major and minor axes are changed from those of the previous work piece, i.e., a different peripheral wave shape is to be formed, a loosening of the nut 44 is followed by suitable turning of the adjusting screw 76 when the lever 100 has been rotated clockwise (as seen in FIG. 8) to disengage the gear 90. If the next work piece is to have three similar equispaced lobes as indicated in FIG. 3, other gears 88', 90' (FIG. 10) may be substituted in the box 82 which are of different diameter and number of teeth to provide faceplate speed one third that of the spindle 28, or the fulcrum shaft 86 withdrawn to enable substitution of a suitable new gear box assembly. FIGS. 2 and 3 indicate external cam shapes; internal shapes may also be formed by the use of this invention, the original blanks then initially having smaller inner radii.

Operation of the shaping attachment is perhaps best understood if first considered as used to produce a single lobe type periphery. For this purpose the "floating" gear assembly could theoretically employ gears driving the ring gear 62 eccentrically with respect to the axis of the spindle 28 but in 1:1 ratio. Actually, this ratio would be more simply attained by merely locking the gearing against rotation by pinning the faceplate gear 62 to the spindle gear 68. A cylindrical work piece is secured to the center of the first plate, and the slide hub 52 (together with the faceplate rotating on the slide hub) is shifted off-center for the spindle as above described by a selected amount, for instance ⅛". In each spindle rotation the work piece 22 is now caused to rotate in a ¼" circle around the spindle axis. Thus in each spindle rotation the work piece advances toward and retracts from the grinder wheel 20 just once. This setting of the attachment therefore effects grinding of a surface portion of the work piece into the desired one lobe or cylindrical shape eccentric by ⅛" to an unground portion of the work piece. Considering operating theory further, if in lieu of 1:1 gearing, a gear box assembly providing faceplate rotation half as fast as the spindle and slide hub 52 is substituted in the housing 84, a different result is attained even when the assembled ⅛" eccentricity is retained. The slide hub 52 still travels a ¼" circular path around the spindle axis, but now does so twice during each faceplate or work piece revolution. Therefore, the work piece 22 is advanced toward and withdrawn from the grinder wheel 20 twice in each spindle revolution, and with sine wave or harmonic motion. Hence an elliptoidal periphery is ground having a radius at the major axis which is ¼" greater than the minor axis radius. This is true since, in the interval that the work piece turns the included 90° angle, the spindle and slide hub were rotating 180° to progress eccentricity of the slide hub from an extreme of ⅛" travel out to a ⅛" travel in, or a total distance of ¼". This ¼", in terms of harmonic drive wave generator cams would be the $d$, or total radial deflection of a wave. The major diameter of the elliptoidal shape would be ½" greater than the minor diameter. Similarly, substitution of a gear system as shown in FIG. 10 to provide faceplate rotation one-third the speed of the spindle and its slide hub will produce a 3-lobed harmonic shape having selected wave height.

Inspection of work pieces ground by the use of the attachment of this invention has shown that the departures of the theoretic harmonic wave shapes desired have been very small, on the order of less than .0001", and that even these usually minor deviations occur only in non-critical areas between major and minor radii. Accordingly in the manufacturing of sinusoidal shapes, such as most wave generator type cams employ, this invention insures shape accuracy to the extent that in many cases actual inspection may be omitted and production expedited.

Having thus described our invention, what we claim as new and desire to secure by Letters Patent of the United States is:

1. An attachment for a machine tool of the grinder type including a grinding wheel and a rotary spindle, comprising a faceplate for supporting a work piece, a ring gear eccentric to the spindle axis for supporting the faceplate, means for adjusting the eccentricity of the ring gear with respect to the spindle axis, and a floating gear system interconnecting the spindle and the ring gear to drive the latter at a speed in selected ratio to the spindle speed.

2. In combination with a machine having a shaping tool, a bed, a drive spindle carried by the bed relatively to position the axis of the spindle with respect to an operating locality of the tool, and means for rotating the spindle on its axis at selected speed, an attachment for causing a work piece to be shaped by the tool with a wavy surface, said attachment comprising a rotary work support, means mounted on the spindle for predetermining eccentricity of the work support and of the work piece secured thereon with respect to the spindle axis, drive means operatively connected to the spindle for rotating the work support in predetermined ratio to said spindle speed, the work support drive means including a housing for the attachment, a gear box pivotally mounted in the housing, at least one idler gear journaled in said box and having driven connection with the spindle, and means operatively connecting the idler gear to said rotary work support, and means under the control of an operator for disconnecting the work support from the idler gear to facilitate a change in the selected eccentricity of the work support.

3. In a grinding machine of the type having a grinding wheel and a rotary spindle, an attachment to be driven by the spindle for forming a work piece with a wavy periphery, said attachment comprising a guide secured to the spindle, a slide hub radially adjustable on the guide, means for thus adjusting the slide hub, means including a faceplate and a ring gear concentrically carried by the slide hub for eccentrically driving the work piece with respect to the spindle axis, a housing for the attachment, and a gear system floatingly mounted in the housing for operatively connecting the spindle to the ring gear for driving the latter at a speed in selected ratio to that of the spindle.

References Cited
UNITED STATES PATENTS

| | | | |
|---|---|---|---|
| 1,474,868 | 11/1923 | Walker | 3—31 |
| 1,798,059 | 3/1931 | Bilgram et al. | 90—3 |
| 2,592,875 | 4/1952 | Durland | 51—105 X |
| 2,733,560 | 2/1956 | Strnad | 51—237 |

LESTER M. SWINGLE, *Primary Examiner.*